United States Patent [19]

Edström et al.

[11] 3,986,120
[45] Oct. 12, 1976

[54] TELEPHONE SYSTEM COMPRISING A SATELLITE

[75] Inventors: Nils Herbert Edström, Bromma; Bo Gustav Haglund, Trangsund, both of Sweden

[73] Assignee: Telefonaktiebolaget L M Ericsson, Stockholm, Sweden

[22] Filed: Apr. 2, 1975

[21] Appl. No.: 564,313

[30] Foreign Application Priority Data
Apr. 19, 1974 Sweden................................ 7405279

[52] U.S. Cl.................................. 325/4; 179/15 BZ
[51] Int. Cl.² .......................................... H04J 5/00
[58] Field of Search ....... 179/15 BS, 15 AS, 15 AD, 179/15 BZ, 15 A, 15 BY, 15 AT, 15 BA, 18 J; 325/4, 55

[56] References Cited
UNITED STATES PATENTS

| | | | |
|---|---|---|---|
| 3,492,430 | 1/1970 | Viglianti.......................... | 179/15 AT |
| 3,634,627 | 1/1972 | Velentini........................ | 179/15 BA |
| 3,879,581 | 4/1975 | Schlosser et al.................. | 325/4 X |

Primary Examiner—Benedict V. Safourek
Attorney, Agent, or Firm—Hane, Baxley & Spiecens

[57] ABSTRACT

The invention relates to a telephone system comprising: a satellite arranged to relay a plurality of signalling channels and speech transmission channels; a plurality of earth stations having a plurality of line equipments each of which is connected to a subscriber, a signalling equipment connected to such line equipments and arranged to transmit reports about the states of such subscribers and to receive commands about allocated calling and called sides of the speech transmission channels to calling and called subscribers over the signalling channels, and a frequency synthesizer equipment connected to the line equipments and arranged to connect the calling and called subscribers to their allocated sides of the speech transmission channels under control of the commands; and a central control station comprising a second signalling equipment arranged to receive the reports and transmit the commands, and a control equipment connected to the second signalling equipment and arranged to generate the commands and address them to the earth stations.

2 Claims, 5 Drawing Figures

TELEPHONE SYSTEM COMPRISING A SATELLITE

The invention relates to a telephone system comprising: a satellite arranged to relay a plurality of one-way signalling channels and one-way speech transmission channels, the latter being paired into two-way speech transmission channels; a plurality of earth stations comprising a plurality of line equipments each of which is connected to a subscriber and has an input for incoming speech signals, a first output for signals indicating the condition of the subscriber and a second output for outgoing speech signals and number information from the subscriber, a signalling equipment connected to the first output of the line equipments and adapted to transmit reports about the conditions of the subscribers and to receive commands about the allocation of calling and called sides of said two-way speech transmission channels to calling and called subscribers over the signalling channels, and a frequency synthesizer equipment connected to the input and the second output of the line equipments and arranged to connect the calling and called subscribers to their allocated sides of the two-way speech transmission channels under control of said commands; and a central control station in which a second signalling equipment is arranged to receive said reports and transmit said commands and a control equipment, connected to the second signalling equipment, for generating the commands and address them to the earth stations.

The publication INTELSAT/IEE Conference on Digital Satellite Communication, No. 59, 1969 describes telephone systems which comprise a synchronous satellite and in which a plurality of earth stations are connected to their respective transit stations and comprise respective control processors arranged to distribute transmission channels from a pool of transmission channels between the earth stations in proportion to their actual need for transmission capacity. The object of this so-called DA-technique, DA being an abbreviation for demand assignment, is to achieve an effective utilization of the satelite's limited number of transmission channels. It is for example possible to take advantage of those variations in the traffic density between the earth stations due to differences in the local time. A number of transmission channels of so-called PA-type, PA being an abbreviation for preassigned, are permanently distributed between the earth stations to give them sufficient transmission capacity for their average traffic so that the transmission channels of the DA-type from said pool will only be needed during traffic peaks.

An extension of a telephone system of the above mentioned type to comprise also a plurality of unsophisticated earth stations which are connected directly to subscribers offers a solution to the problem of giving telephone service to such sparsely populated areas where it is difficult to establish reliable terrestrial networks.

An object of the invention is which a telephone system that comprises a satellite and a plurality of earth stations connected directly to subscribers shall have a low total cost.

Another object is that such a telephone system shall have the same behaviour relative the subscribers as a conventional telephone system.

The invention, the characteristics of which appear from the appended claims, will now be described more in detail with reference made to the accompanying drawing where:

Figure 1:
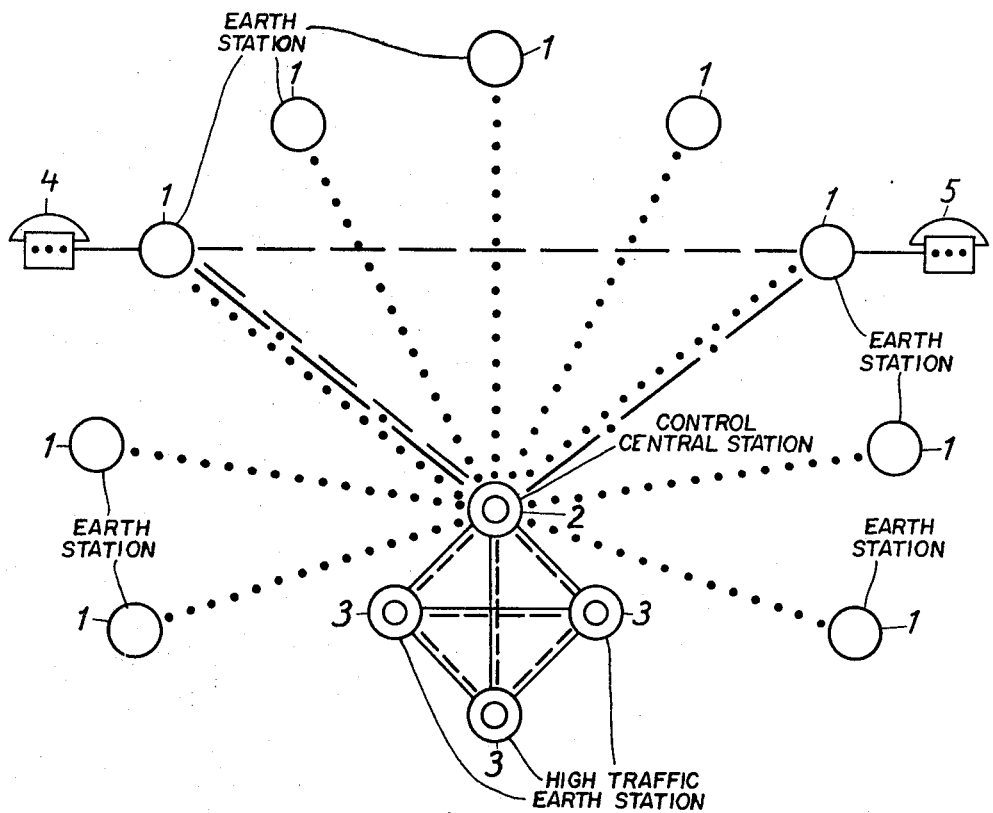
FIG. 1 shows signalling and speech transmission paths in a telephone system according to the invention.

FIG. 1 shows the signalling and speech transmission paths in a telephone system comprising: a synchronous satellite (not shown) arranged to relay a plurality of one-way signalling channels and one-way speech transmission channels, the latter being paired into two-way speech transmission channels; a plurality of low traffic earth stations 1 comprising a plurality of line equipments each of which is connected to a subscriber and has an input for incoming speech signals, a first output for signals indicating the subscriber condition, and a second output for outgoing speech signals and number information from the subscriber, a signalling equipment connected to the first output of the subscriber equipment and arranged to transmit reports about the subscriber conditions and to receive commands about the allocation of calling and called sides of the two-way speech transmission channels to calling and called subscribers over said signalling channels, and a frequency synthesizer equipment connected to the input and to the second output of the line equipment and arranged to connect the calling and called subscribers to their allocated sides of said two-way speech transmission channels under control of said commands; and a central control station 2 in which a second signalling equipment is arranged to receive the reports and to transmit the commands, and a control equipment connected to the second signalling equipment, for generating the commands and address them to the low traffic earth stations 1.

In the central control station 2 in FIG. 1 a number information decoding means is connected to a data input of the control equipment, and a frequency synthesizer equipment is arranged to connect the number information decoding means to the called sides of said two-way transmission channels.

In FIG. 1 a small number of high traffic earth stations 3 are connected to their respective transit stations in an extensive conventional telephone system and are connected with each other and with the central control station 2 partly via a terrestrial network and partly via the synchronous satellite. According to the example, the central control station 2 is also connected to a transit station in said telephone network. Among the two-way speech transmission channels of the synchronous satellite, a first number of channels, the transmission paths of which are symbolized by continuous lines, are permanently distributed between the earth stations 3, and a second number of channels, the transmission paths of which are symbolized by dashed lines, can temporarily be allocated to any one of these earth stations under control of the central control station 2 in a known manner, as described e.g. in the U.S. Pat. No. 3,848,093.

According to an example shown in FIG. 1 it is assumed that a subscriber 4 lifts a handset from a telephone set arranged for voice frequency keying and the earth station 1 to which the subscriber 4 is connected transmits via a first signalling channel, the transmission path of which is symbolized by a dotted line, a report about a calling condition at the subscriber 4 to the central control station 2. In response thereto, station 2 generates a command about allocation of a two-way speech transmission channel, that temporarily is free, to the subscriber 4 and transmits this command via a second signalling channel, the transmission path of which is symbolized via a dash-dotted line, to the earth station 1 of the subscriber 4. The frequency synthesizer equipment of the earth station associated with subscriber 4 then connects the allocated subscriber 4 to a calling side of the speech transmission channel. At the same time the frequency synthesizer equipment of the central control station 2 connects the number information decoding means to a called side of the allocated speech transmission channel to enable the transmission of number information regarding a called subscriber 5 from the subscriber 4 to the control equipment of the central control station 2 via the speech transmission channel, the transmission path of which is symbolized via a dashed line.

The control equipment of the central control station 2 localizes now, by means of the number information, that particular earth station 1 to which the called subscriber 5 is connected, generates a command about allocation of the called side of the speech transmission channel to the called subscriber 5, and transmits this command via the second signalling channel to the earth station 1 of the subscriber 5. The frequency synthesizer equipment of this earth station 1 connects the subscriber 5 to the called side of the speech transmission channel. Then a speech circuit between the subscribers 4 and 5, symbolized with a dashed line, is established and will be supervised by the control equipment of the central control station 2 which periodically receives reports about the conditions of the subscribers 4 and 5 transmitted from their respective earth stations 1.

It is to be noted that the control station 2 will transmit only speech circuits established over its own transit station. When e.g. a speech circuit is established via the synchronous satellite between a calling subscriber that has a terrestrial connection to an earth station 3 via a local station and a transit station, and a called subscriber connected to an earth station 1, the control station 2 will not transit it although it takes part in the establishment of the speech circuit.

Figure 2:
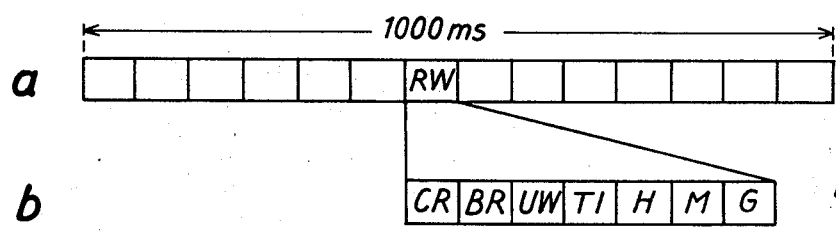
FIGS. 2 and 3 show signalling frames for the signalling between a plurality of earth stations connected directly to subscribers and; a central control station in the telephone system of FIG. 1 and FIGS. 4 and 5 show block diagrams over the internal structure of the earth stations and the control station respectively.
Figure 3:
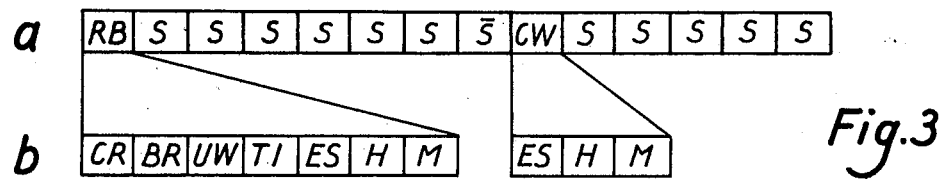

FIGS. 2 and 3 show signalling frames for the signalling between the earth stations 1 and the central control station 2 in FIG. 1. According to the example the earth stations 1 are divided into 10 groups each of the order of 100 earth stations. In each group the individual earth stations are allocated a common first signalling frame that has a length of 1000 ms and respective time slots within the frame according to line $a$ in FIG. 2 to transmit via a first 4 kHz signalling channel report words RW to the central control station 2 in the form of bursts. These bursts comprise in a sequential order shown on line $b$ in the same figure information regarding carrier synchronism CR, bit synchronism BR, word synchronism UW, transmitting station TI, message type H, and actual message M, whereafter a guarding interval G follos to inhibit overlapping between the bursts from the earth stations 1 because of minor errors in their mutual synchronism.

The division of the earth stations 1 into groups each of which is allocated a signalling frame that has a length of 1000 ms implies that an extension of the telephone system of FIG. 1 to comprise more earth stations 1 can be accomplished simply by adding one signalling frame of the same length for each ground station to be added, all the signalling frames allocated the earth stations 1 being transmitted within separate 4 kHz signalling channels.

The central control station 2 is allocated a separate second signalling frame according to line $a$ in FIG. 3 of the same length as the first signalling frame, 1000 ms, to transmit via a second 4 kHz signalling channel partly time and synchronizing information in the form of a reference burst RB and partly command words CW as soon as these are required by the earth stations 1. The control station 2 is, furthermore, arranged to trasmit in pauses occurring between the command words CW continuous synchronizing information S in the form of a bit pattern which according to the example consists of alternately occurring binary ones and zeros. When a command word CW is to be transmitted the control station 2 is arranged to indicate this in advance by a temporary change $\bar{S}$ in the synchronism information S obtained simply by a repetition of e.g. the binary digit zero in said bit pattern.

The reference burst RB comprises in a sequential order shown on line $b$ in FIG. 3 information regarding carrier synchronism CR, bit synchronism BR, word synchronism UW, transmitting station TI, addressed station ES, message type H and actual message M. The information regarding the addressed station ES may refer to all the earth stations 1 as well as to a selected group among them in order to enable the transmission of a common command. The command words CW comprise information regarding an earth station 1 that is selectively addressed, the message type H and the actual message M.

The information regarding the word synchronism UW comprises a word that is unique in the signalling frame in FIG. 3 and is detected by the earth stations 1. A time signal is generated upon the completed detection and is utilized to insure that the respective burst from the earth stations 1 will arrive at the transponders in the synchronous satellite and at the central control station within time slots whose time positions are fixed in relation to the time position of the reference burst RB.

The extra synchronism information S is used to maintain during the pauses between the reference burst RB and the command words CW the most accurate synchronism possible in the modems in the earth stations 1 as well as in the transponders in the synchronous satellite in the telephone system.

Figure 4:
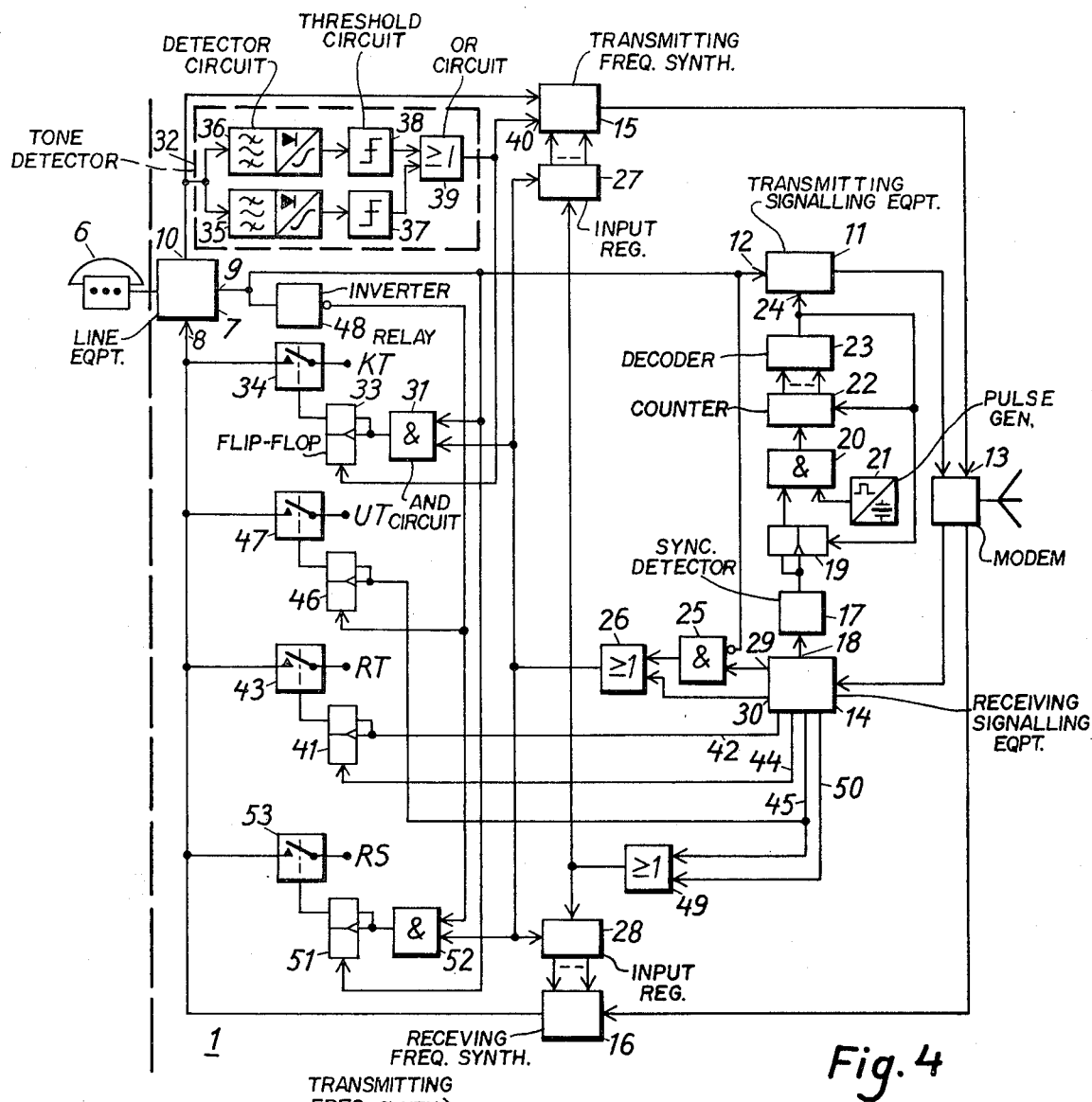

FIG. 4 shows a block diagram of the internal structure in any of earth stations 1 in FIG. 1 and the connection to a subscriber 6 that, according to the example, has a telephone set equipped for voice frequency keying. A line equipment 7, that has a two-wire connection to the subscriber 6 and comprises a transmission bridge of two matched transformers to provide an intermediate link to a four-wire connection, is provided with an input 8 for incoming speech signals, a first output 9 for signals indicating the condition of the subscriber 6, which information is received via a line relay in the line equipment 7, and a second output 10 for outgoing speech signals and number information from the subscriber 6. A transmitting signalling equipment 11 has an input 12 connected to said first output 9 of the line equipment 7 and is arranged to transmit the report words RW via a modem 13, and a receiving signalling equipment 14 is arranged to receive the command words CW via the same modem 13. A transmitting frequency synthesizer equipment 15 and a receiving frequency synthesizer equipment 16 are connected to the second output 10 and to the input 8, respectively, of the line equipment 7, and are arranged to connect the subscriber 6 to calling or called sides of an allocated two-way speech transmission channel via the modem 13 and under control of said command words CW.

A synchronism detector 17 is connected to a first output 18 of the receiving signalling equipment 14 to detect the unique word UW in the signalling frame according to FIG. 3 and to generate the time signal in the form of a short pulse upon completion of the detection. The pulse is fed to an input of an edge triggered flip-flop 19 to set it and thereby activate an AND-gate 20 to supply high frequency pulses from a crystal controlled pulse generator 21 to a counter 22. A decoder 23 is connected to the counter 22 and is arranged to supply an activation signal to an activation input 24 of the transmitting signalling equipment 11 when the counter 22 has counted an appropriate number of pulses from the pulse generator 21 to insure that the burst of the report word RW will arrive at the transponders in the synchronous satellite and at the central control station 2 in FIG. 1 within a time slot whose time position is fixed in relation to the time position of the reference burst RB, taking into consideration also the transmission time from the actual earth station 1. The activation signal from the decoder 23 is also used for resetting the counter 22 and the flip-flop 19.

An AND-gate 25 is connected in series with an OR-gate 26 between two input registers 27 and 28 provided for the transmitting frequency synthesizer equipment 15 and the receiving synthesizer equipment 16 respectively, and a second output 29 of the receiving signalling equipment 14. The second output 29 is arranged for supplying a first control code to the input registers 27 and 28 obtained via said command words CW and indicating a called side of a two-way speech transmission channel allocated to the subscriber 6. An inhibition input of the AND-gate 25 is connected to said first output 9 of the line equipment 7 to prevent the influencing of the frequency synthesizer equipments 15 and 16 by said control code if the subscriber 6 should be occupied, in which case the hand handset is off-hook and a binary one-signal is supplied on the inhibition input. By this arrangement time is saved during the establishment of connections because the reporting from the earth station 1 to the control station 2 can be made after that the connection is established.

The input registers 27 and 28 of the frequency synthesizer equipments 15 and 16 are also arranged to be fed via the OR-gate 26 and a third output 30 of the receiving signalling equipment 14 with a second control code obtained from the command word CW and indicating a calling side of a two-way speech transmission channel allocated to the subscriber 6. The command word CW is in this case generated in such a way that the transmitting signalling equipment 11 has, via its input 12, connected to said first output 9 of the line equipment 7, sensed that the subscriber 6 has gone off-hook and has then transmitted a message about the calling condition at the subscriber 6 to the control station 2 via said report word RW.

The line equipment 7 is allotted: an AND-gate 31 that has a control input connected to said first input 9 of the line equipment 7 in order to beceome activated upon a calling condition at the subscriber 6; a tone detector 32 that has an input connected to second output 10 of the line equipment 7 and an output arranged to supply an output signal upon the occurrence of said number information; an edge triggered flip-flop 33 that has a set input connected to said third output 30 of the receiving signalling equipment 14 via the AND-gate 31 and the OR-gate 26 to become set by said second control code indicating a calling side of a two-way speech transmission channel allocated to a subscriber 6 and a reset input connected to the output of the tone detector 32 to become reset by said number information; and a relay 34 that has a control input connected to an output of the flip-flop 33 and is arranged to connect a keying tone voltage KT to said input 8 of the line equipment 7 when the flip-flop 33 is set. The purpose of the arrangement is to interrupt the keying tone to the subscriber 6 immediately when the number information occurs. If the interruption of the number information should in known manner be connected for its decoding which takes place in the control station 2, the keying tone should be interrupted with a delay of ½ second.

The tone detector 32 comprises two tone detector circuits 35 and 36 are tuned to a first frequency band covering 697–941 Hz and a second frequency band covering 1209–1477 Hz respctively allocated to said number information and are connected in parallel between the input and the output of the tone detector 32 via a respective threshold circuit 37 and 38 and a respective input of an OR-gate 39. The output of the tone detector 32 is in addition connected to an activation input 40 of the transmitting frequency synthesizer equipment 15 to provide transmission therefrom only for number information or outgoing speech. Because the tone detector 32 reacts selectively on the number information and the speech signals and is relatively insensitive to background noise it is possible to economize the total instantaneous transmitting power on the speech transmission channels in the transponders of the synchronous satellite in the telephone system.

The line equipment 7 is also allotted a flip-flop 41 that has a set input connected to a fourth output 42 of the receiving signalling equipment 14 arranged for supplying a set signal to the flip-flop 41 obtained from said command words CW and representing the information that a subscriber called upon by the subscriber 6 is idle and receiving a ring signal, which information the control station 2 has obtained by said report words RW from that earth station 1 to which the called subscriber is connected. A relay 43 has a control input connected to an output of the flip-flop 41 and is arranged to connect a ringing tone voltage RT to input 8 of the line equipment 7 when the flip-flop 41 is set. A reset input of the flip-flop 41 is connected to a fifth output 44 of the receiving signalling equipment 14 arranged for supplying a reset signal to the flip-flop 41 obtained by said command words CW when the central control station 2 has received a report from that earth station 1 to which the called subscriber is connected that this has answered.

A sixth output 45 of the receiving signalling equipment 14 supplies a set signal to a flip-flop 46 when the command words CW indicate that the control station 2 has received a report indicating that the called subscriber is busy, whereupon a relay 47 that has a control input connected to an output of the flip-flop 46 feeds a busy tone voltage UT to said input 8 of the line equipment 7. When the subscriber 6 replaces the handset a binary zero signal is obtained on said first output 9 of the line equipment 7 which zero signal is inverted by an inverter 48 to form a reset signal that is fed to a reset input of the flp-flop 46.

The reset signal that is fed to the flip-flop 46 from the sixth output 45 of the receiving signalling equipment 14 is in addtion fed via an OR-gate 49 as a reset signal to the reset inputs of the input registers 27 and 28 for the transmitting and receiving frequency synthesizer equipment 15 and 16 respectively. A reset signal to these input registers 27 and 28 is in addition obtained from a seventh output 50 of the receiving signalling equipment 14 when the command word CW indicates that a conversation has been terminated. This command word CW is generated in such a way that the transmitting signalling equipment 11 has sensed that the subscriber 6 has replaced his handset via its connection 12 to said first output 9 of the line equipment 7 and has transmmitted a report on this to the central control station 2.

If on the other hand the subscriber 6 should be called upon and be allocated a called side of a two-way speech transmission channel via the control code from the second output 29 of the receiving signalling equipment 14 the same control code is used for setting a flip-flop 51 via an AND-gate 52 that has a control input connected to the inverter 48. A relay 53 that has a control input connected to an output of the flip-flop 51 supplies a ringing voltage RS to the input 8 of the line equipment 7 when the flip-flop 51 is set. The flip-flop has a reset input connected to the first output 9 of the line equipment 7 and is consequently reset when the subscriber 6 off-hooks the handset.

Figure 5:
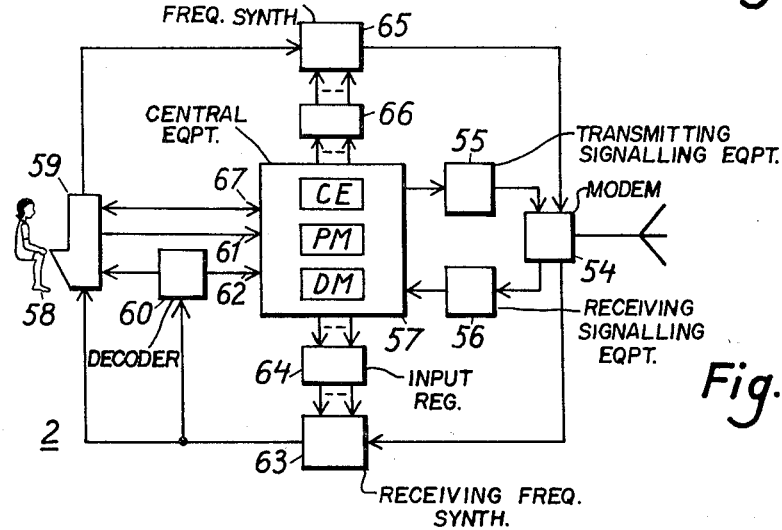

FIG. 5 shows a block diagram of the internal structure of the central control station 2 in FIG. 1 which comprises: a modem 54; a transmitting signalling equipment 55 arranged to transmit said reference burts RB, synchronism information S and command words CW via the modem 54; a receiving signalling equipment 56 arranged to receive said report words RW via the same modem 54; and a control equipment 57 that contains a central processor unit CE, a program memory PM and a data memory DM and is connected to the transmitting and receiving signalling equipment 55 and 56 respectively, and is also arranged to generate said command words CW and address them selectively to the earth stations 1.

In the central control station 2 an operator 58 at a switch board 59 and a decoder 60 for said voice frequency keyed number information are connected to a respective data input 61 and 62 of the control equipment 57. The decoder 60 is in addition connected to the switchboard 59 to provide the operator 58 with a visual display of the decoded number information. A receiving frequency synthesizer equipment 63 is arranged to connect the operator 58 at the switchboard 59 and the decoder 60 to called sides of two-way speech transmission channels allocated to calling subscribers in the telephone system. The receiving frequency synthesizer equipment 63 is then controlled by a control code written into an input register 64 by the control equipment 57. The latter can through the described arrangement receive verbal as well as voice frequency keyed number information from the calling subscribers via their allocated speech transmission channels.

A transmitting frequency synthesizer equipment 65 is arranged to provide the operator 58 at the switchboard 59 with a wo-way connection to the calling subscribers under control of a second control code written into a second input register 66 by the control equipment 57. The operator 58 at the switchboard 59 has in addition a two-way connection 67 to the control equipment 57 in order to be able to take an active part in the establishment of speech circuits between the subscribers in the telephone system. This in combination with the fact that the operator 58 is able to talk with the calling subscribers makes the telephone system in FIG. 1 very flexible and also gives it the capacity to serve illiterates.

It is to be noted that if the number information is supplied from the calling subscribers in the form of dialling pulses, these can be converted to a voice frequency code for transmission via the speech transmission channels allocated to the subscribers in such a way that they are arranged to key a tone voltage by means of a relay in the line equipment 7 in FIG. 4. The tone code that the decoder 60 in FIG. 5 shall decode is in this case received in the form of a number of tone bursts corresponding to the number of dialling pulses.

We claim:

1. Telephone system comprising: a satellite arranged to relay a plurality of one-way signalling channels and one-way speech transmission channels, the latter being paired into two-way speech transmission channels; a plurality of earth stations, each of said earth stations comprising a plurality of line equipments each of which being connected to a subscriber and having an input for incoming speech signals, a first output for signals indicating the condition of the subscriber and a second output for outgoing speech signals and number information from the subscriber, a signalling equipment connected to said first output of said line equipments and arranged to transmit reports about the conditions of said subscribers and to receive commands about allocated calling and called sides of said two-way speech transmission channels to calling and called subscribers over said signalling channels, and a frequency synthesizer equipment connected to said input and said second output of said line equipments and arranged to connect said calling and called subscribers to their allocated sides of said two-way speech transmission channels under control of said commands; and a central control station comprising a second signalling equipment arranged to receive said reports and transmit said commands, and a control equipment connected to said second signalling equipment and arranged to generate said commands and address them to said earth stations, said earth stations being divided into groups whose individual earth stations are permanently allocated a common first signalling frame and a respective time slot therein to transmit via a first signalling channel among said signalling channels said reports to said central control station, and said central control station being allocated a second signalling frame comprising a synchronizing signal for said first signalling frame which is utilized exclusively by said central control station to make possible the transmission, via a second signalling channel among said signalling channels, said commands to said earth stations as soon as they are needed.

2. A telephone system in accordance with claim 1, in which said central control station is arranged to transmit within said second signalling frame continuous synchronizing information in the pauses occurring between said commands.

* * * * *